(12) United States Patent
Bernier et al.

(10) Patent No.: US 7,368,935 B2
(45) Date of Patent: May 6, 2008

(54) TAMPER RESPONSE SYSTEM FOR INTEGRATED CIRCUITS

(75) Inventors: Brian R. Bernier, Tampa, FL (US); Jason Waltuch, St. Petersburg, FL (US)

(73) Assignee: Honeywell International Inc., Morristown, NJ (US)

(*) Notice: Subject to any disclaimer, the term of this patent is extended or adjusted under 35 U.S.C. 154(b) by 119 days.

(21) Appl. No.: 11/253,006

(22) Filed: Oct. 18, 2005

(65) Prior Publication Data

US 2007/0086257 A1    Apr. 19, 2007

(51) Int. Cl.
*H03K 19/00* (2006.01)
(52) U.S. Cl. .................. 326/8; 326/9; 326/38
(58) Field of Classification Search ........... 326/8–9, 326/38
See application file for complete search history.

(56) References Cited

U.S. PATENT DOCUMENTS 6,396,400 B1 * 5/2002 Epstein et al. ............ 340/550
7,015,823 B1 * 3/2006 Gillen et al. ............... 340/652

* cited by examiner

*Primary Examiner*—Anh Q. Tran
(74) *Attorney, Agent, or Firm*—McDonnell Boehnen Hulbert & Berghoff LLP

(57) ABSTRACT

A tamper response system to protect intellectual property is provided. In one embodiment, the tamper response system includes at least one sensor adapted to sense tamper activity and a tamper circuit. The tamper circuit is coupled to receive tamper signals from the at least one sensor. Moreover, the tamper circuit is adapted to clear at least one field programmable gate array (FPGA) upon receipt of a tamper signal.

30 Claims, 3 Drawing Sheets

TAMPER RESPONSE SYSTEM FOR INTEGRATED CIRCUITS

TECHNICAL FIELD

The present invention relates generally to security systems and in particular to protecting intellectual property with a tamper response system.

BACKGROUND

A field-programmable gate array (FPGA) is an integrated circuit that is capable of being reprogrammed in the field after manufacture. In particular, an FPGA is made up of logic gates whose connections are readily programmed into specific configurations by the user. The design, which is resident in the FPGA, is proprietary information that can be very valuable. Accordingly, the ability to keep others from obtaining the programming information is important for both business and military reasons. Typical non-volatile FPGAs come with a test mode and a read back mode. Bedsides their intended functions, these modes enable reverse engineering of the FPGA device.

Some manufactures of non-volatile FPGAs protect important or sensitive information in the FPGA by disabling the test and read back modes with the use of security bits. However, the use of thermal imaging can be used to locate these security bits. Once located, they can be disabled with a high energy light source. In addition, other proprietary information that is stored in memory devices in communication with associated FPGAs can be obtained by reverse engineering techniques.

For the reasons stated above and for other reasons stated below which will become apparent to those skilled in the art upon reading and understanding the present specification, there is a need in the art for a tamper response system that protects proprietary information from reverse engineering techniques.

SUMMARY OF INVENTION

The above-mentioned problems of current systems are addressed by embodiments of the present invention and will be understood by reading and studying the following specification.

In one embodiment, a tamper response system is provided. The tamper system includes at least one sensor adapted to sense tamper activity and a tamper circuit. The tamper circuit is coupled to receive tamper signals from the at least one sensor. The tamper circuit is adapted to clear at least one field programmable gate array (FPGA) upon receipt of a tamper signal.

In another embodiment, a tamper system is provided. The tamper system includes at least one sensor adapted to sense tamper activity and a tamper circuit. The tamper circuit is coupled to receive tamper signals from the at least one sensor. In addition, the tamper circuit is adapted to erase information in at least one memory upon receipt of a tamper signal.

In yet another embodiment, a tamper circuit is provided. The tamper circuit includes a sensor input, an FPGA control output and a control circuit. The sensor input is adapted to receive tamper signals from one or more sensors. The FPGA control output is adapted to send an FPGA clearance signal to an FPGA to clear the FPGA. The memory erase output is adapted to erase a memory in communication with the memory erase output. The control circuit is adapted to process tamper signals received at the sensor input. The control circuit is further adapted to send the FPGA clearance signal to the FPGA control output and to control the memory erase output based on the processed tamper signals.

In still yet another embodiment, a method of protecting data in a FPGA is provided. The method comprises sensing tamper activity and in response to the sensing of tamper activity, overwriting the FPGA.

In another embodiment, a machine readable medium having instructions stored thereon for protecting digital information is provided. The method comprises processing tamper signals from one or more tamper sensors. Manipulating an interface clearance input on an FPGA to clear the FPGA of information based on the processed tamper signals and erasing at least one memory based on the processed tamper signals.

In finally another embodiment, a digital data tamper system is provided. The system comprises a means to detect tamper activity. A means to clear at least one FPGA upon detection of tamper activity and a means to erase at least one memory upon detection of the tamper activity.

BRIEF DESCRIPTION OF THE DRAWINGS

The present invention can be more easily understood and further advantages and uses thereof more readily apparent, when considered in view of the description of the preferred embodiments and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide a system to prevent the extraction of digital information in memory and/or a field-programmable gate array (FPGA). In particular, embodiments use tamper sensors to detect tamper activity and a tamper circuit that erases or clears digital information in respective memories and FPGAs.

Figure 1:
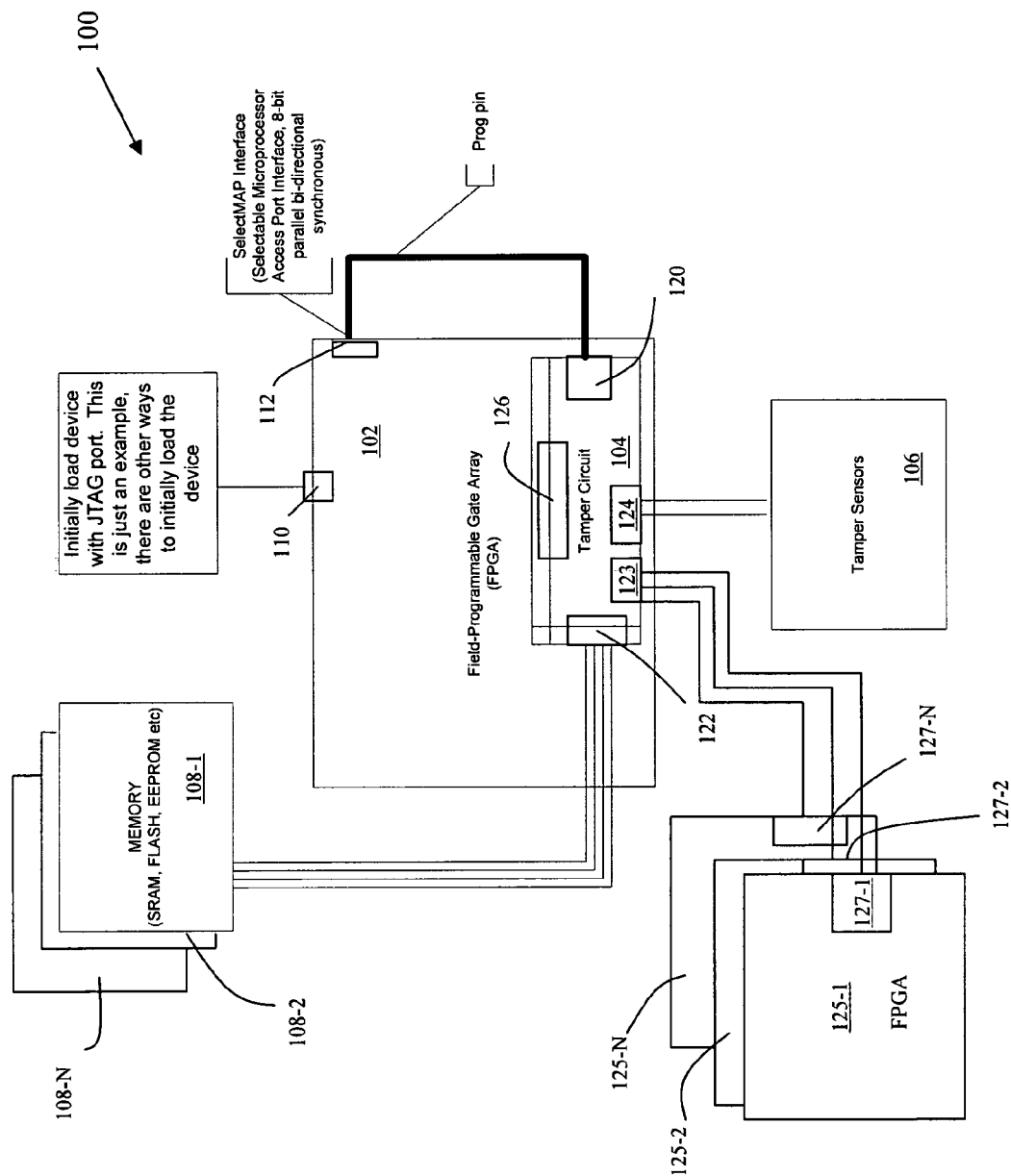
FIG. 1 is a block diagram of one embodiment of the present invention.

Referring to FIG. 1, one embodiment of a tamper protection system 100 of one embodiment of the present invention is illustrated. As illustrated, this embodiment includes a tamper circuit 104 and tamper sensors generally designated as 106. The tamper sensors 106 are designed to detect tamper activity such as reverse engineering activities used to extract information. In embodiments of the present invention, tamper sensors 106 include one or more of fiber optic sensors, infra-red sensors, vibration or motion sensors, thermal or temperature sensors, acoustic sensors, noise sensors, light sensors, pressure sensors, volumetric sensors, stress sensors, line of sight (LOS) sensors, biometric sensors, humidity sensors, surge sensors, voltage sensors, radio frequency interface (RFI) sensors, electromagnetic interface (EMI) sensors and the like. The tamper sensors are in communication with a sensor input 124 of the tamper circuit 104. When a tamper sensor 106 detects tamper activity, the tamper sensor 106 sends a tamper signal to the sensor input 124 on the tamper circuit 104.

The tamper circuit 104 includes a control circuit 126. The control circuit 126 is designed to process tamper signals received on the sensor input 124 and control erase operations based on the received tamper signals. As illustrated in FIG. 1, the tamper circuit 104 also includes a first FPGA control output 120. The first FPGA control output 120 is coupled to a FPGA clearance interface 112. The FPGA clearance interface 112 is used to overwrite information in the FPGA 102. When a tamper signal is received at the sensor input 124, the control circuit 126 manipulates the FPGA clearance interface 112 via the FPGA control output 120 to overwrite information in the FPGA 102. An example of such a clearance interface is a Prog pin of FPGAs produced by the Xilinx Corporation.

As illustrated in FIG. 1, the tamper circuit 104 is also coupled to memory 108-1 via memory erase output 122. The memory 108-1 may be any type of memory such as SRAM, FLASH, EEPROM and the like. Moreover, in this embodiment, the memory erase output 122 is coupled to more than one memory 108-1 through 108-N. When a tamper signal is received at the sensor input 124, the control circuit 126 erases the memory 108-1 through 108-N via the memory erase output 122. Moreover, in one embodiment, the control circuit 126 is programmed to erase information in the memory 108-1 through 108-N in a predefined order. This allows for the most sensitive data to be erased first thereby maximizing protection of the intellectual property.

In the embodiment of FIG. 1, the tamper circuit 104 is coupled to FPGA clearance interfaces 127-1 through 127-N on respective external FPGA's 125-1 through 125-N via a second FPGA control output 123. When a tamper signal is received at the sensor input 124, the control circuit 126 in the tamper circuit 104 manipulates the FPGA clearance interfaces 127-1 through 127-N to overwrite information on the respective FPGAs 125-1 through 125-N. Accordingly, in at least one embodiment of the present invention, the tamper circuit 104 located on the FPGA 102 is designed to clear one or more external FPGAs 125-1 through 125-N.

Also illustrated in FIG. 1 is the FPGA information loading interface 110. This interface is used to initially load the FPGA 102 with information. One example of an information loading interface 110 on an FPGA is the Joint Test Action Group (JTAG) port also known as IEEE standard 1149. Moreover, in the embodiment of FIG. 1, the tamper circuit 104 is on the FPGA 102. In this embodiment, once the information in the memory 108-1 through 108-N and in the FPGA 102 regions excluding the tamper control circuit have been erased or cleared, the tamper circuit disconnects a pointer in the FPGA 102 to itself.

Figure 2:
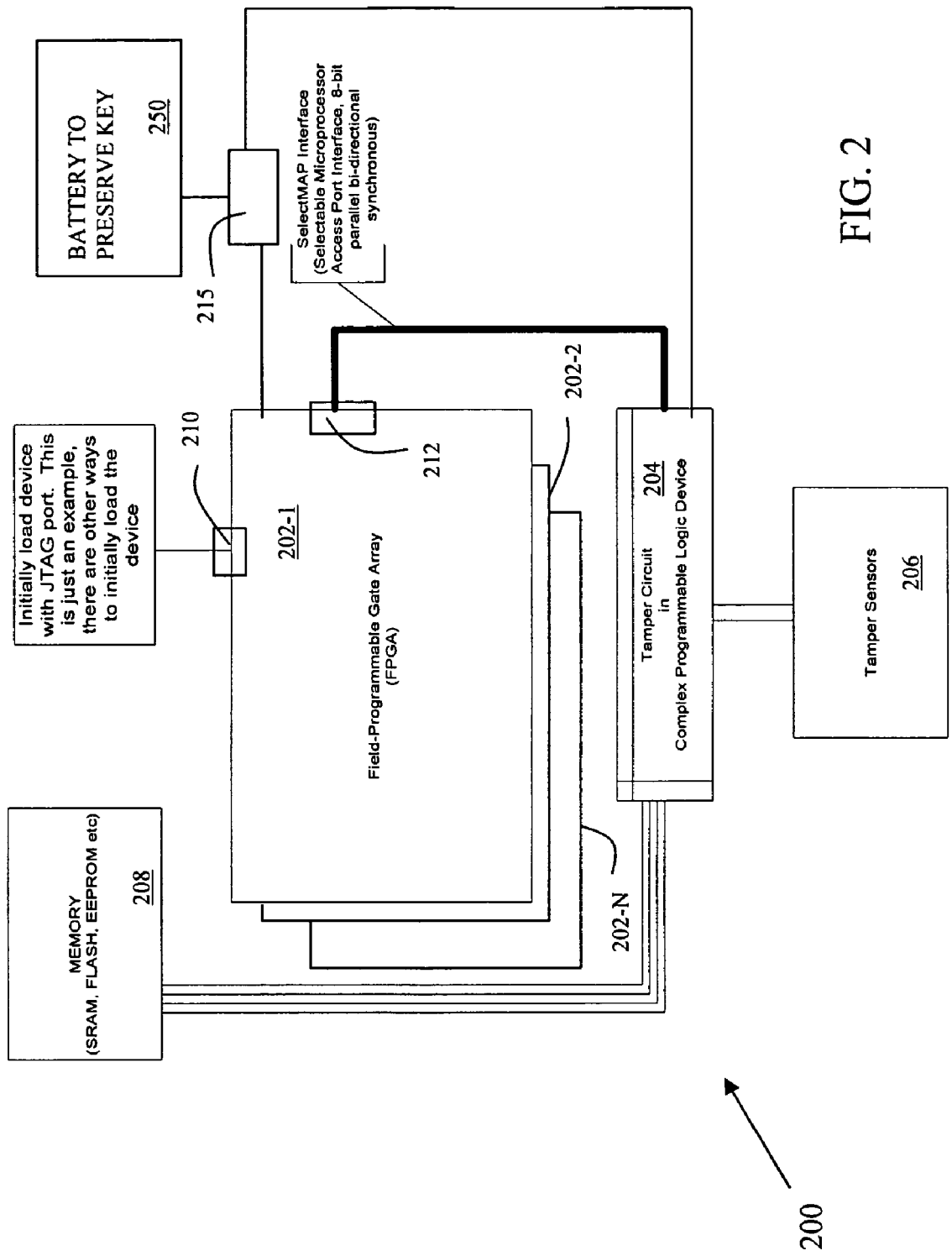
FIG. 2 is a block diagram of another embodiment of the present invention.

Referring to FIG. 2 another embodiment of a tamper circuit system 200 of the present invention is provided. FIG. 2 includes tamper circuit 204, tamper sensors 206, memory 208, FPGAs 202-1 through 202-N, FPGA loading interface 210, FPGA clearance interface 212 and battery 250. As illustrated in this embodiment, more than one FPGA 202-1 through 202-n can be cleared with the tamper circuit 204. Moreover, in this embodiment the tamper circuit 204 is located external to the FPGAs 202-1 through 202-N in a volatile memory. Therefore, once the tamper circuit 204 has erased or cleared all the information in the memory 208 and the FPGAs 202-1 through 202-N it simply disconnects power to itself and it is erased.

As indicated above, this embodiment also includes battery 250. In some FPGAs a battery 250 is used to preserve a key that is used for security purposes. In one embodiment, the tamper circuit 204 is designed to cut power from the battery 250 to the FPGA 202-1 with a battery disconnect circuit 215 upon detection of tamper activity by the tamper sensors 206.

Figure 3:
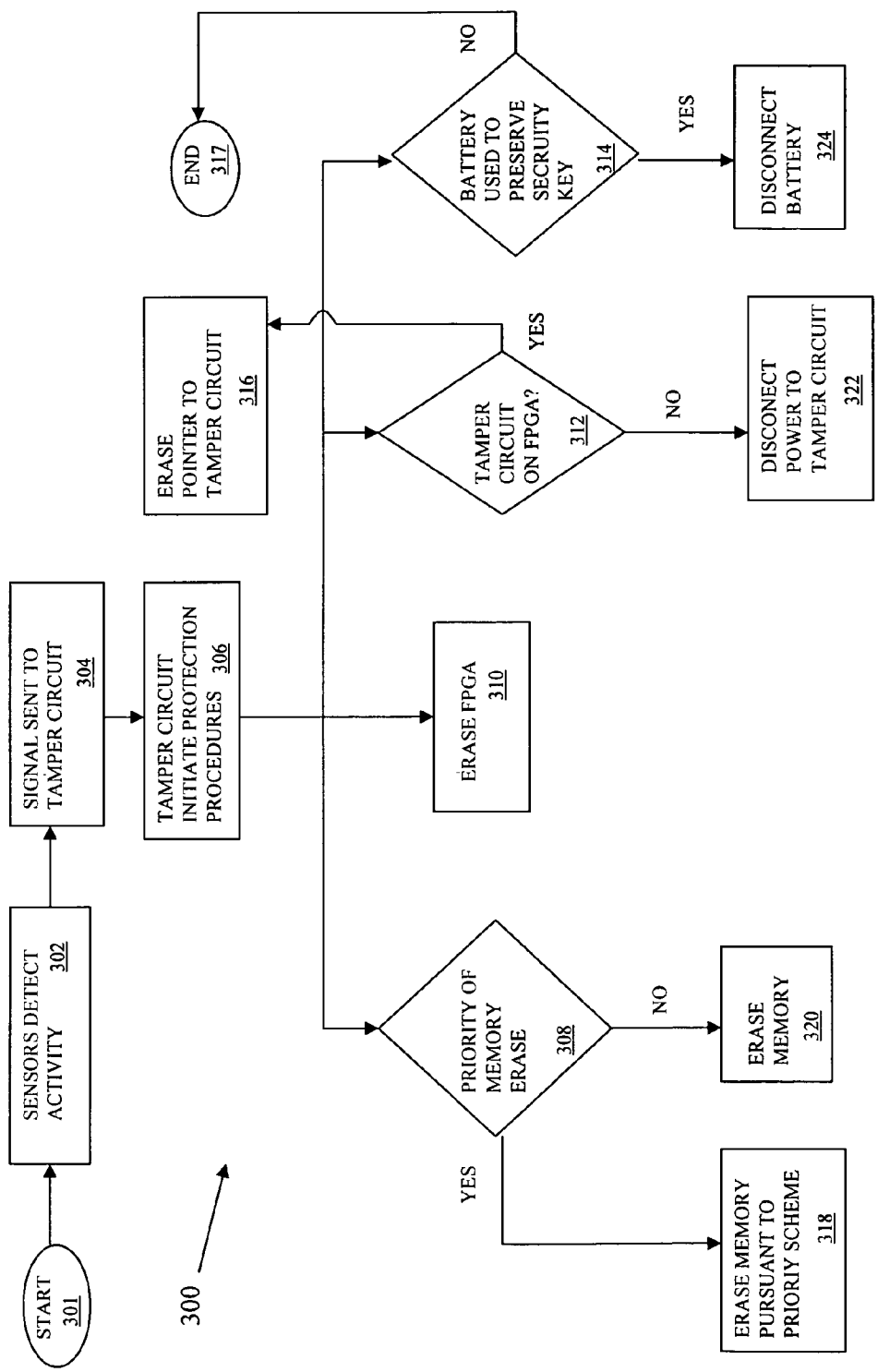
FIG. 3 is a flow chart illustrating the implementation of embodiments of the present invention.

FIG. 3 is a flow chart 300 illustrating methods of implementing embodiments of the present invention. As illustrated the process starts (301) with the detection of tamper activity with the tamper sensors (302). Tamper signals 304 are sent to a tamper circuit in response to the detected tamper activity (304). The tamper circuit initiates protection procedures (306). The protection procedures include erasing memories coupled to the tamper circuit. First it is determined if the information in a memory is to be erased in a predetermined fashion (308). This is used when information or data in a memory has different levels of importance or sensitivity. The most important or most sensitive data in this scheme will be erased first to ensure it will not be detected. If there is a priority scheme in place (308), the memory is erased pursuant to the priority scheme (318). If there is not a priority scheme in place (308), the data is erased in no particular order (320).

The protection procedure, in one embodiment, includes the clearing of information in one or more FPGAs (310). As discussed above, in one embodiment, this is accomplished by manipulating (toggling) an FPGA clearance interface of the FPGA. Next, the protection procedures in one embodiment includes the protection of the tamper circuit. This occurs after the memories and FPGAs have been cleared. First it is determined if the tamper circuit is on an FPGA (312). If the tamper circuit is on an FPGA, a pointer in the FPGA to the tamper circuit is cleared (316). If the tamper circuit is not on an FPGA (312), the tamper circuit is in volatile memory in one embodiment. If the tamper circuit is volatile it disconnects power to itself to prevent it from being discovered with reverse engineering techniques (322).

In one embodiment the tamper protection procedures also includes the determination of if the FPGA includes a key that is preserved by a battery (314). If it does not, the process ends (317). If the FPGA includes a key that is preserved by a battery (314), the tamper circuit disconnects the battery to the FPGA (324). The disconnection of the battery occurs prior to the protection procedures being initiated to protect the tamper circuit itself.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A tamper response system comprising:
at least one sensor adapted to sense tamper activity; and
a tamper circuit coupled to receive tamper signals from the at least one sensor, the tamper circuit adapted to clear at least one field programmable gate array (FPGA) upon receipt of a tamper signal;
wherein the tamper circuit is disabled after the at least one FPGA has been cleared.

2. The tamper response system of claim 1, wherein the tamper circuit is located remote to the at least one FPGA in a volatile memory, the tamper circuit further adapted to shut power off to it-self after the at least one FPGA has been cleared.

3. The tamper response system of claim 1, wherein the tamper circuit resides on one of the at least one FPGA, the tamper circuit adapted to remove a pointer to the tamper circuit after the one FPGA has been cleared.

4. The tamper response system of claim 1, wherein the tamper circuit clears the at least one FPGA by toggling an interface clearance pin on the at least one FPGA that is adapted to clear the at least one FPGA when toggled.

5. The tamper response system of claim 1, wherein the at least one sensor is at least one of a fiber optic sensor, an infra-red sensor, a vibration sensor, a thermal sensor, an acoustic sensor, noise sensor, a light sensor, a pressure sensor, a volumetric sensor, a stress sensor, a LOS sensor, a biometric sensor, a humidity sensor, a surge sensor, a voltage sensor, a radio frequency interface (RFI) sensor and a electromagnetic interface (EMI) sensor.

6. The tamper response system of claim 1, wherein the tamper circuit is further adapted to disconnect a power source to the at least one FPGA upon receipt of the tamper signal.

7. The tamper response system of claim 1, wherein in the tamper circuit is further adapted to erase information in at least one memory upon receipt of the tamper signal.

8. The tamper system of claim 7, wherein the tamper circuit is further adapted to erase information in the at least one memory by a predefined sequence, wherein information needing the highest level of protection is erased first.

9. A tamper system comprising:
at least one sensor adapted to sense tamper activity; and
a tamper circuit coupled to receive tamper signals from the at least one sensor, the tamper circuit adapted to erase information in at least one memory upon receipt of a tamper signal;
wherein the tamper circuit is disabled after the information from the at least one memory has been cleared.

10. The tamper system of claim 9, wherein the tamper circuit is further adapted to erase information in the at least one memory by a predefined sequence, wherein information needing the highest level of protection is erased first.

11. The tamper response system of claim 9, wherein the at least one sensor is at least one of a fiber optic sensor, an infra-red sensor, a vibration sensor, a thermal sensor, an acoustic sensor, a noise sensor, a light sensor, a pressure sensor, a volumetric sensor, a stress sensor, a LOS sensor, a biometric sensor, a humidity sensor, a surge sensor, a voltage sensor, a radio frequency interface (RFI) sensor and an electromagnetic interface (EMI) sensor.

12. The tamper system of claim 9, wherein the tamper circuit is further adapted to clear at least one field programmable gate may (FPGA) upon receipt of a tamper signal.

13. The tamper response system of claim 12, wherein the tamper circuit is located remote in a volatile memory, the tamper circuit further adapted to shut power off to it-self after the at least one FPGA has been cleared.

14. The tamper response system of claim 12, wherein the tamper circuit resides on the at least one FPGA, the tamper circuit adapted to remove a pointer to the tamper circuit after the at least one FPGA has been cleared.

15. A tamper circuit comprising:
a sensor input adapted to receive tamper signals from one or more sensors;
an FPGA control output adapted to send a FPGA clearance signal to an FPGA to clear the FPGA;
a memory erase output adapted to erase a memory in communication with the memory erase output; and
a control circuit adapted to process tamper signals received at the sensor input, the control circuit further adapted to send the FPGA clearance signal to the FPGA control output and to control the memory erase output based on the processed tamper signals;
wherein the tamper circuit is disabled after the FPGA has been cleared and the memory has been erased.

16. The tamper circuit of claim 15, wherein the control circuit is further adapted to erase information in the memory based on a defined priority sequence.

17. The tamper circuit of claim 15, wherein the tamper circuit is volatile and the control circuit is further adapted to disconnect power to itself after the memory and FPGA have been cleared.

18. The tamper circuit of claim 15, wherein the control circuit resides on the FPGA and the control circuit is further adapted to disconnect a pointer to the tamper circuit upon completion of the clearing of the FPGA and the erasing information in the memory.

19. The tamper circuit of claim 15, wherein the control circuit is further adapted to disconnect power to the FPGA to disable a key of the FPGA.

20. A method of protecting data in a FPGA using a tamper sensor coupled to a tamper circuit to detect tamper activity, the method comprising:
sensing tamper activity;
in response to the sensing of tamper activity, overwriting the FPGA; and
disabling the tamper circuit after the FPGA has been overwritten.

21. The method of claim 20, wherein overwriting the FPGA further comprises:
toggling an interface clearance pin on the FPGA with the tamper circuit.

22. The method of claim 21, further comprising:
in response to the sensing of tamper activity, erasing at least one memory.

23. The method of claim 22, wherein erasing the at least one memory further comprises:
erasing information in the at least one memory in a predefined sequence such that information that is the most sensitive is erased first.

24. The method of claim 21, wherein the tamper circuit is located on the FPGA and the method further comprises:
removing a pointer to the tamper circuit in the FPGA after the FPGA has been cleared.

25. The method of claim 21, wherein the tamper circuit is volatile, the method further comprising:
disconnecting power to the tamper circuit after the FPGA has been cleared.

26. A machine readable medium having instructions stored thereon for protecting digital information, the method comprising:
processing tamper signals from one or more tamper sensors on a tamper circuit;
manipulating an interface clearance input on an FPGA to clear the FPGA of information based on the processed tamper signals;
erasing at least one memory based on the processed tamper signals; and disabling the tamper circuit after the FPGA has been cleared and the at least one memory has been erased.

27. The machine readable instructions of claim 26, further comprising:
erasing information in the a least one memory in a predefine sequence such that information that is the most valuable is erased first.

28. The machine readable instructions of claim 26, further comprising:
removing a pointer to the tamper circuit in the FPGA when information in the FPGA and the at least one memory is cleared.

29. The machine readable instructions of claim 26, further comprising:
disconnecting power to the tamper circuit when information in the FPGA and the at least one memory is cleared.

30. A digital data tamper system, the system comprising:
a means to detect tamper activity;
a means to clear at least one FPGA upon detection of tamper activity;
a means to erase at least one memory upon detection of the tamper activity; and
a means to prevent the detection of the digital tamper system after the at least one FPGA has been cleared and the at least one memory has been erased.

\* \* \* \* \*